(12) United States Patent
Bismuth et al.

(10) Patent No.: US 6,188,809 B1
(45) Date of Patent: Feb. 13, 2001

(54) METHOD AND DEVICE FOR CONTROLLING THE POLARIZATION OF A BEAM OF LIGHT

(75) Inventors: Jacques Bismuth; Michael Trzecieski, both of Ottawa; Rajiv Iyer; Paul Colbourne, both of Nepean, all of (CA)

(73) Assignee: JDS Fitel Inc., Nepean (CA)

( * ) Notice: Under 35 U.S.C. 154(b), the term of this patent shall be extended for 0 days.

(21) Appl. No.: 09/229,162

(22) Filed: Jan. 13, 1999

(51) Int. Cl.$^7$ .......................................... G02B 6/00
(52) U.S. Cl. .................... 385/11; 385/2; 385/3; 385/8; 359/245; 359/246
(58) Field of Search ................ 385/2, 3, 8, 11; 359/245, 246

(56) References Cited

U.S. PATENT DOCUMENTS

| | | | |
|---|---|---|---|
| 4,898,441 | * 2/1990 | Shimizu | 385/11 |
| 5,212,743 | 5/1993 | Heismann | 385/11 |
| 5,561,726 | 10/1996 | Yao | 385/11 |

OTHER PUBLICATIONS

Analysis of a Reset–Free Polarization Controller for Fast Automatic Polarization Stabilization in Fiber–optic Transmission Systems, Fred Heismann, Journal of Lightwave Technology Apr. 1994 vol. 12 No. 4.

* cited by examiner

*Primary Examiner*—Thong Nguyen
*Assistant Examiner*—Craig Curtis
(74) *Attorney, Agent, or Firm*—Neil Teitelbaum

(57) ABSTRACT

Broad wavelength tuning range are achieved in an effectively reset-free, optical, automatic polarization controller by providing a device and method for varying the polarization of an input beam of light. A block of electro-optic material has two pairs of electrodes for applying a voltage across the block. Light is launched into an input end of the block for receiving the input beam of light. A controller controls a quadrature voltage applied to the first and a second pair of electrodes; the quadrature voltage has the form of a magnitude and an angle. The quadrature voltage can be varied in such a manner as to orient a given electric field within the electro-optic material through a plurality of angles, for example between 0 and $2\pi$ radians; the magnitude of the quadrature voltage can be set to create an arbitrary retardance from 0 to $2\pi$. Any output polarization state can be realized by appropriately varying the magnitude and angle of the voltage applied to the Vx and Vy electrodes.

16 Claims, 9 Drawing Sheets

- - - ΓΓ (50 mm, Vz, 1 mm, 0, λ)
- · - ΓΓ (50 mm, Vz, 1 mm, T, λ)
- - - ΓΓ (50 mm, Vz, 1 mm, 50, λ)
—— ΓΓ (50 mm, Vz, 1 mm, 100, λ)

METHOD AND DEVICE FOR CONTROLLING THE POLARIZATION OF A BEAM OF LIGHT

FIELD OF THE INVENTION

This invention relates to devices for controlling polarization of incident optical signals and, more particularly, to devices which permit endless or reset-free operation.

BACKGROUND OF THE INVENTION

Optical signals in standard, non-polarization preserving optical fibre-based communication systems experience random changes in polarization state from one end of the fibre to the other due to fibre birefringence induced by temperature fluctuations and physical stresses on the fibres. Random polarization changes are evidenced at the output end as polarization dependent loss (PDL) and in some instances polarization mode dispersion (PMD).

In order to correct the polarization state of lightwave signals emerging from the optical fibre transformers have been developed to transform the fibre output polarization into the prescribed polarization state for applications such as heterodyne detection and interferometric signal processing. Conventional polarization transformers provide compensation but require a reset cycle when their operating range is exceeded. Unfortunately, reset cycles give rise to periods of unacceptable data loss. Endless polarization transformers provide continuous control of the polarization state over an infinite range of polarization compensation.

Endless polarization transformers have been developed using cascaded polarization transformers having a limited transformation range such as fibre squeezers and electrooptic devices using lithium niobate or PLZT. While these cascaded devices permit truly endless (reset free) operation, individual elements within the devices still require occasional reset cycles. Although the reset cycles can be performed without affecting the overall polarization transformation (quasi-endless polarization control), these devices generally fail to permit polarization control during reset cycles. Moreover, they require sophisticated and even computer controlled drive algorithms for proper operation.

Fibre squeezers mechanically induce birefringence in the fibre axes to cause retardation between the two orthogonal modes perpendicular and parallel to the direction of pressure. U.S. Pat. No. 5,561,726 in the name of Yao, describes a system that utilizes a rotatable fibre clamp to supply the necessary retardation and optical axis orientation. Although this device can be used for fixed wavelength and temperature and polarization it cannot be used to control real time polarization fluctuation in transmission fibres, because it requires mechanical movement for its control.

Recently, a reset-free, endless polarization transformer was demonstrated performing general polarization transformations from any arbitrarily varying optical input polarization into any arbitrarily output polarization by producing adjustable elliptical birefringence of constant total phase retardation in a single-mode waveguide. See U.S. Pat. No. 4,966,431 issued to Heismann on Oct. 30, 1990. A particular transformation is obtained by adjusting the azimuth of linear birefringence and the ratio of linear to circular birefringence. In its integrated-optic realization, the endless polarization transformer includes at least one cascadable transformer section comprising cascaded first and second TE TM mode converters. Phase shifting (TE/TM) is performed in a section between the mode converters, in a section following the mode converters, or both between and following the mode converters. All sections are formed over a birefringent waveguide capable of supporting propagation of TE and TM optical signal modes. While the recent endless, reset-free polarization transformer is cascadable and affords simplicity of design and operation over prior art devices, it cannot be overlooked that this polarization transformer has a relatively narrow optical bandwidth at wavelengths of interest less than 1 nm at 1.55 $\mu$m and permits only limited tunability over a small wavelength range approximately 10 nm.

Heismann in U.S. Pat. No. 5,212,743 entitled Automatic Polarization Controller Having Broadband Reset-Free Operation, incorporated herein by reference discloses a wide optical bandwidth and broad wavelength tuning range achieved in a reset-free, optical, automatic polarization controller by combining three controllable fractional wave elements in cascade and further by controlling the orientations of both outermost fractional wave elements to differ by a prescribed angular amount which is maintained substantially constant. Synchronous control of both outermost fractional wave elements maintains the prescribed angular difference may be maintained constant during operation of the polarization controller.

In the embodiments described by Heismann, the three fractional wave elements are provided in the form of an endlessly rotatable half-wave element and two synchronously rotatable quarter-wave elements wherein the half-wave element is placed between the quarter-wave elements. Each fractional wave element varies the orientation of retardance along its optical wavepath and introduces a specified phase retardation. Embodiments of the polarization controller are realized using either distributed bulk optic devices or integrated electro-optic waveguide devices. Rotation of the elements is afforded by a feedback control circuit which monitors the output optical polarization and derives appropriate electrical drive signals to achieve the proper rotation of the elements. Although the device taught by Heismann appears to achieve its intended function in many instances it does not provide suitable wavelength and temperature independence.

It is an object of this invention to provide an automatic polarization controller having broadband operation wherein undesired reset operations are obviated and which is relatively wavelength and temperature independent.

It is a further object of the invention to provide an inexpensive, highly responsive device for controlling polarization of an input beam of light having varying polarization states.

SUMMARY OF THE INVENTION

In accordance with the invention, a device for varying or maintaining the polarization of an input beam of light is provided comprising: a block of electro-optic material having terminals for applying voltages Vx and Vy across the block, the block having an input end for receiving the input beam; and, a controller for controlling the voltages Vx and Vy to a first and a second pair of electrodes, the voltages Vx and Vy having the form of a magnitude component and an angular component such that the angular component of the voltages Vx and Vy is varied in such a manner as to orient an electric field within the electro-optic material between the pair of electrodes through a plurality of angles, and such that the magnitude component of the voltages is varied to yield a variable phase retardation .

In accordance with the invention a system is provided for varying or maintaining the polarization state an input beam of light for any given polarization state comprising: a block of electro-optic material having two pairs of electrodes for applying a voltages Vx and Vy in quadrature, the block having an input end for receiving the input beam; and, a controller for controlling voltages applied in quadrature to a first and a second pair of electrodes, the quadrature voltages having the form of $V_0 \sin\theta$ and $V_0 \cos\theta$, the controller for varying magnitude $V_0$ and an angle $\theta$ such that the applied voltages are varied in such a manner as to orient an electric field within the electro-optic material between the pairs of electrodes through a plurality of angles from 0 to y radians and, the controller for varying the magnitude $V_0$ of the applied voltages to yield a retardation 0 to x, wherein one of x and y are equal to at least $2\pi$ radians and the other of x and y are equal to at least $\pi$ radians.

In accordance with another aspect of the invention a method of varying the polarization of an input beam of light is provided comprising the steps of:
a) providing two pairs of electrodes disposed about an electro-optic material;
b) passing the input beam of light through the electro-optic material; and,
c) providing a plurality of different quadrature voltage values, each voltage value having a magnitude component Vo and an angular component $\theta$ to each of the two pairs of electrodes wherein both the magnitude component Vo and angular component $\theta$ differ between some of the plurality of quadrature voltages provided.

In accordance with another aspect of the invention a method of varying the polarization of an input beam of light is provided comprising the steps of:
a) providing two pairs of electrodes disposed about an electro-optic material;
b) passing the input beam of light through the electro-optic material; and,
c) providing a plurality of different voltage values, each voltage value having a magnitude component and an angular component to each of the two pairs of electrodes wherein both the magnitude component and angular component differ between some of the plurality of voltage values provided.

Advantageously, this invention requires only a single stage and only two control parameters, providing simpler control than prior art devices and endless polarization tracking.

BRIEF DESCRIPTION OF THE DRAWINGS

Exemplary embodiments of the invention will now be described in conjunction with the drawings in which.

DETAILED DESCRIPTION

Figure 1:
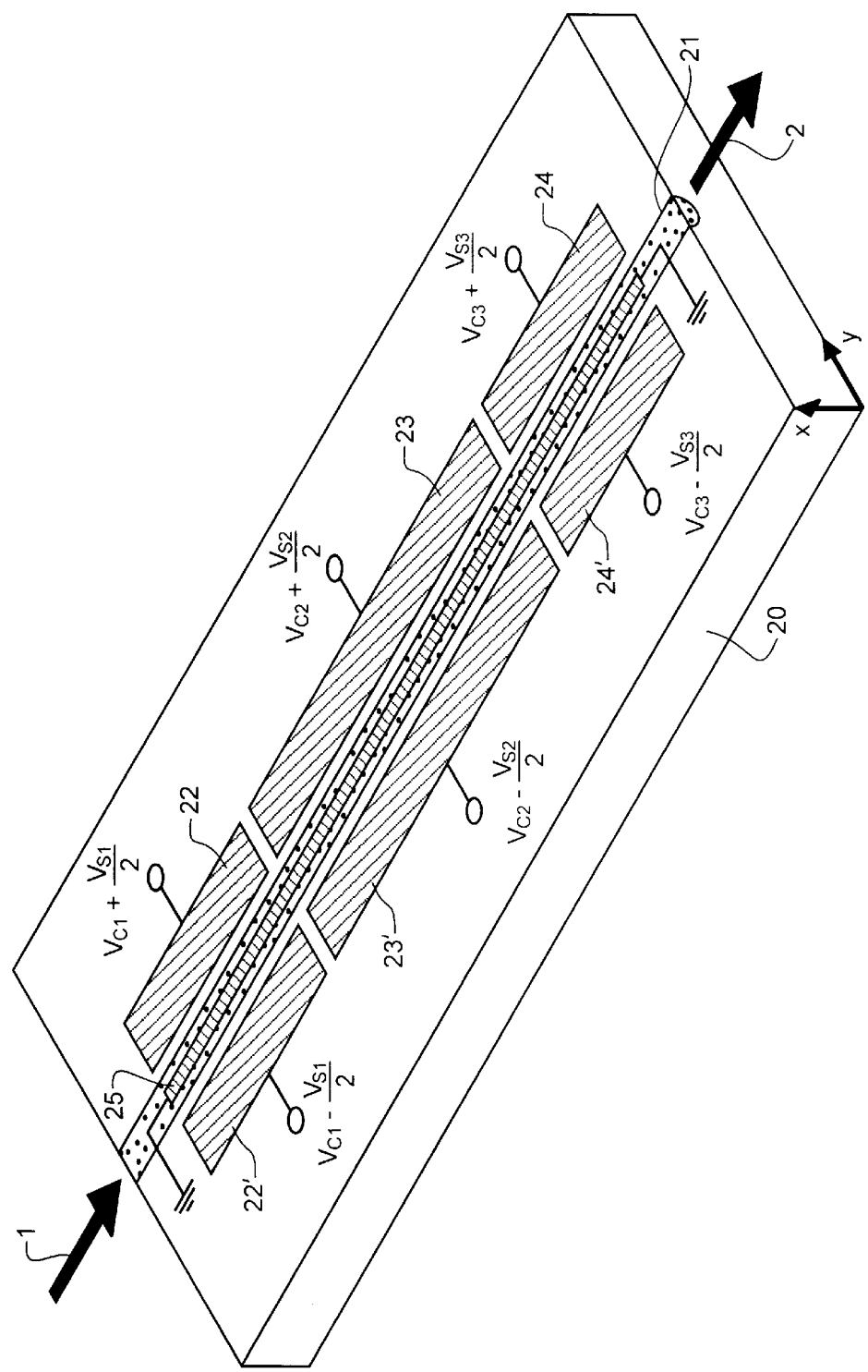
FIG. 1 is a diagram of a prior art polarization control circuit utilizing two quarter wave plates and one half wave plate.

Referring now to FIG. 1, a prior art polarization controller is shown wherein three fixed wave-plates are provided each having a pair of electrodes to which a modified quadrature voltage is applied.

Figure 2:
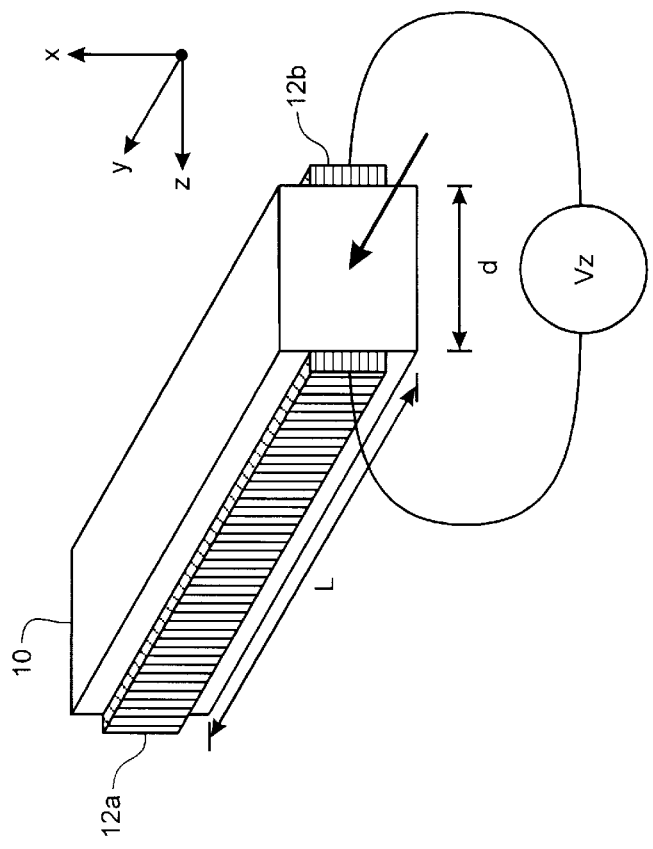
FIG. 2 is diagram of a portion of the conventional polarization modulator wherein a single pair of electrodes coupled to a block of electro-optic material.
Figure 3:
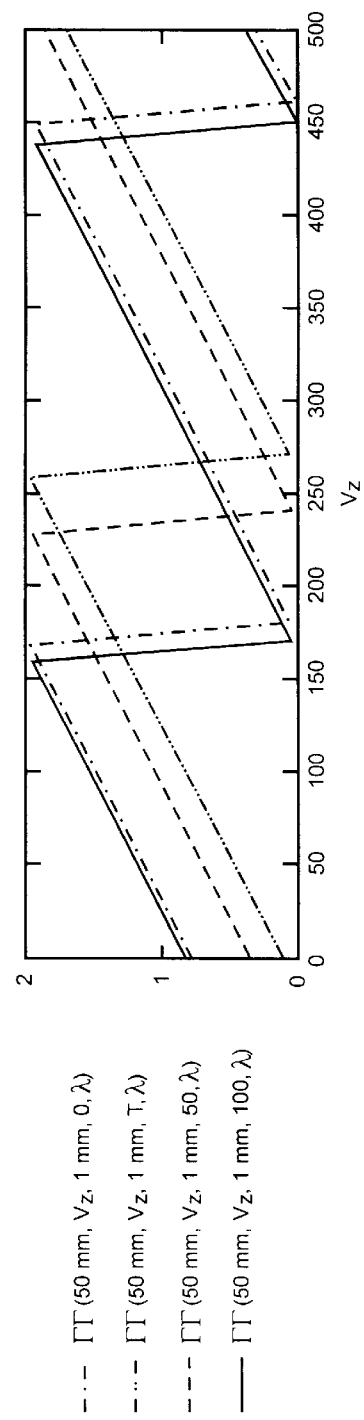
FIG. 3 is a graph of retardance vs. applied voltage simulated for different temperatures from 0 degrees C., to 100 degrees C. based on the Sellemeier Temperature Dependent equations for the ordinary and extra-ordinary indices for the device of FIG. 2.

In FIG. 2 a transverse electric field is applied, in the direction of the crystal axis (z-axis), to fully exploit the large electro-optic coefficient by biasing two electrodes at opposing sides of the wave-plate 10. When zero volts is across the two electrodes 12a and 12b, there is a natural refractive index difference $\Delta n$ of approximately 0.083 between the ordinary and extraordinary axis of the electro-optic material. For a crystal length L of approximately 50 mm and thickness d of 1 mm, this introduces about $4720\pi$ retardance between orthogonal polarization components. By applying a non-zero Vz, additional birefringence is introduced, which is dependent on the aspect ratio d/L, and the applied voltage Vz. Unfortunately, there is also significant temperature dependence for this device. The graph of FIG. 3 shows a 'Retardance vs. Applied Voltage' relationship simulated for different temperatures from 0 degrees C., to 100 degrees C. based on the Sellemeier Temperature Dependent equations for the ordinary and extra-ordinary indices.

Figure 4:
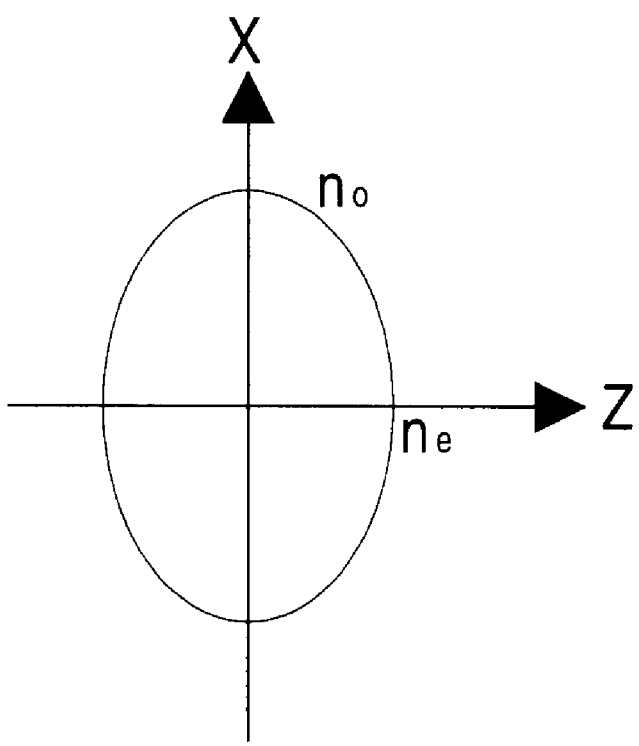
FIG. 4 illustrates the birefringence ellipse of the transverse device of FIG. 2 which is always oriented with it's major and minor axes in the x and z directions.

FIG. 4 illustrates the birefringence ellipse of the transverse device of FIG. 2 which is always oriented with it's major and minor axes in the x and z directions; i.e. the birefringence ellipse never rotates about the optical axis. Therefore this device is useful as a variable polarization retarder, if the temperature of the crystal can be kept constant, and if the penalty associated with biasing the device at a voltage at the zero-retardance point is acceptable.

Figure 5:
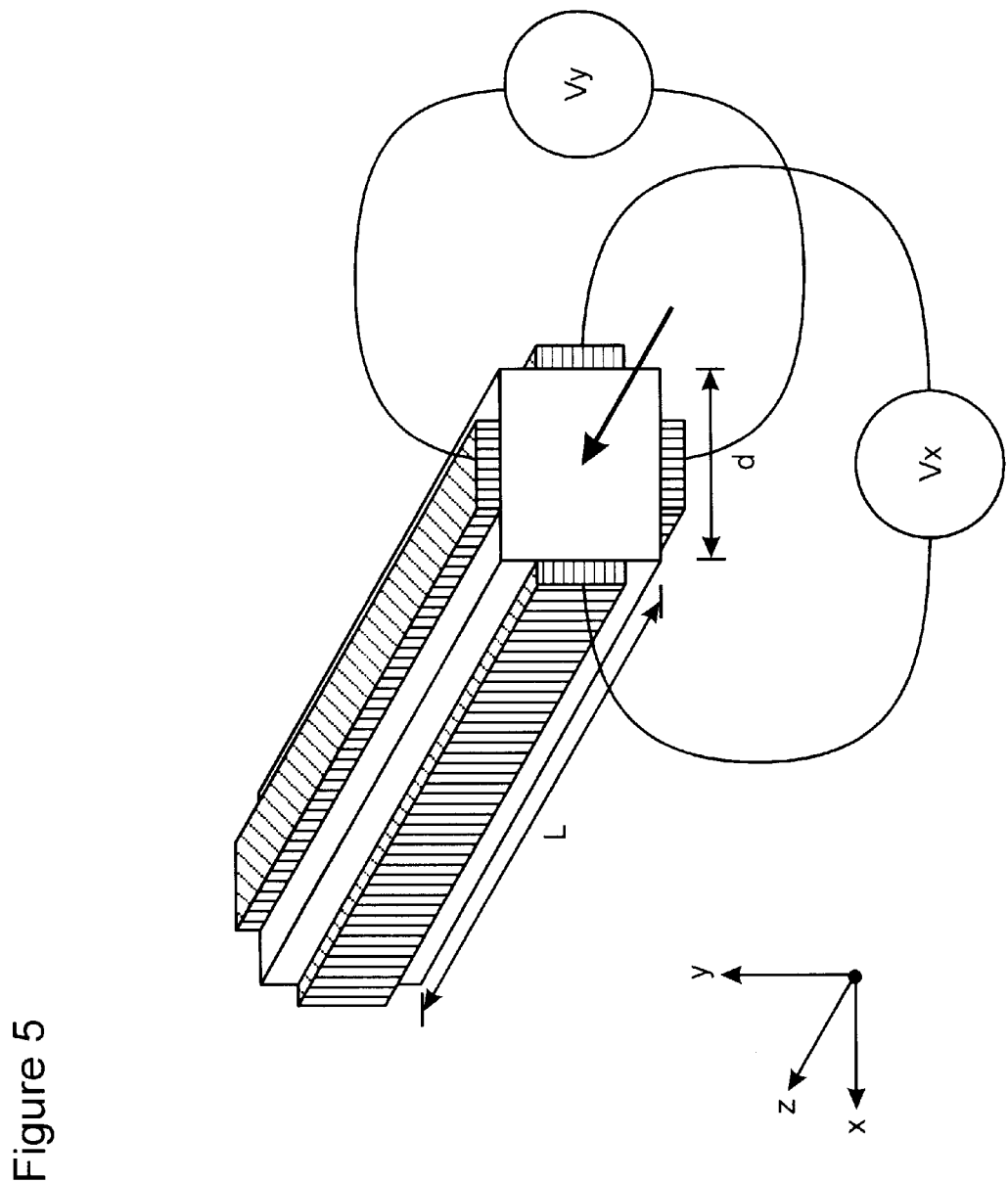
FIG. 5 is a device in accordance with the invention wherein an electro-optic crystal is biased across its x and y axis and is oriented such that light launched into one end propagates along its z-axis.

In accordance with this invention, and referring to FIG. 5, a device 55 includes a crystal 50 being biased across electrodes 52a, 52b, and 54a and 54b. Voltage sources Vx and Vy provide quadrature voltages to the device 55. Electrooptically the crystal 50 behaves as a waveplate. Applied voltage generates an electric field across the axis of the crystal 50 and the electric field creates a refractive index change along that full crystal length of that axis.

FIG. 5 illustrates a rotatable variable retardance waveplate having a length L which in this exemplary embodiment is 100 mm. Incoming light enters a GRIN lens and is collimated through the 1×1×100 mm LiNbO3 crystal length, and is subsequently refocused back into an output fibre. The crystal 50 is metalized with electrodes 52a, 52b, and 54a and 54b on all four long sides. These are electrically isolated from each other.

Figure 10:
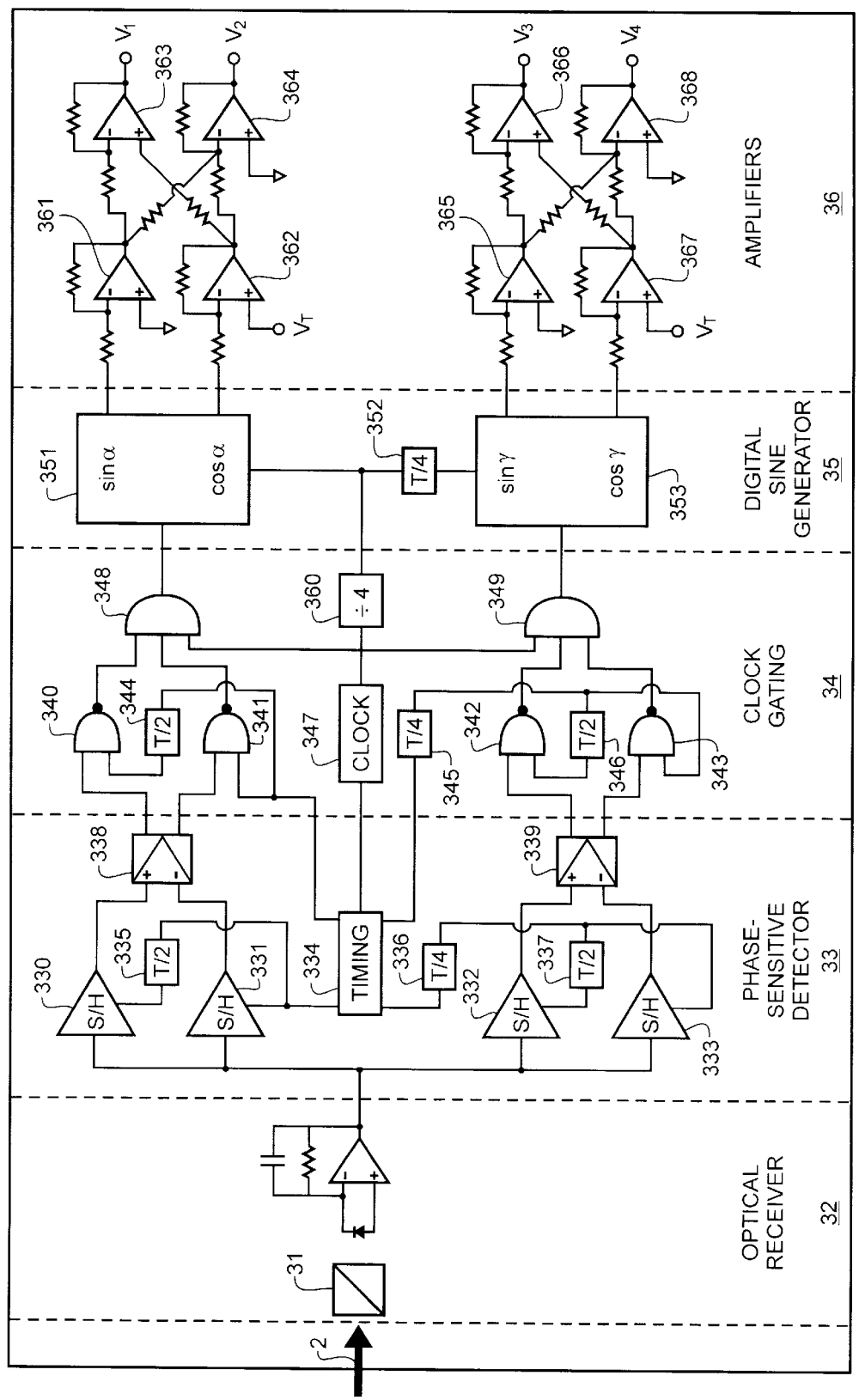
FIG. 10 is a prior art analog control circuit.
Figure 11:
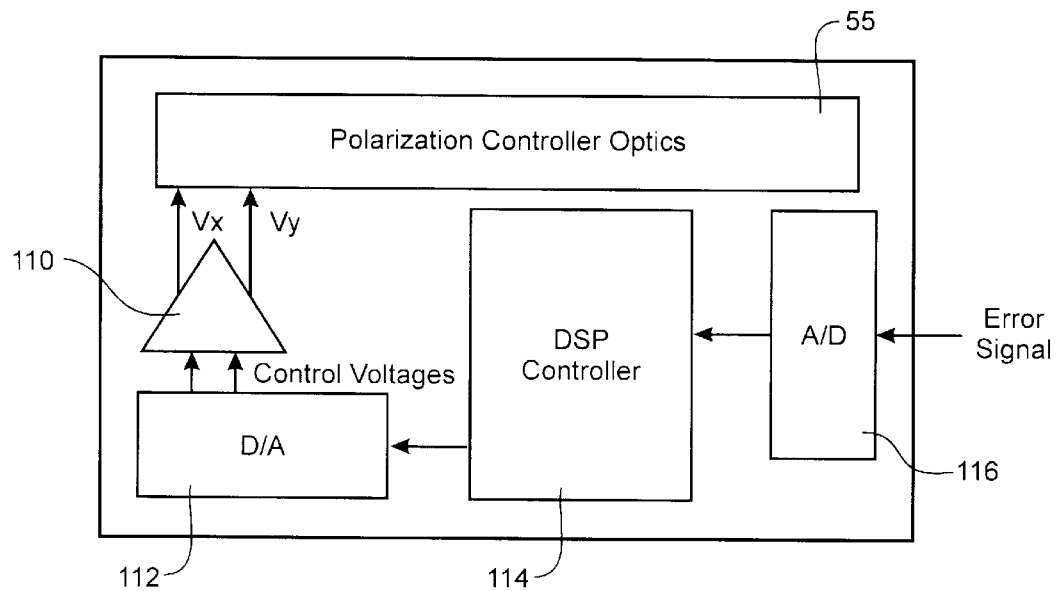
FIG. 11 is a digitally controlled control circuit in accordance with the invention; and, FIG. 12 is a diagram illustrating how an effective reset-free operation is achieved.

The length of the waveplate should be selected in accordance with the magnitude of the applied voltatge Vo for a particular desired retardance to maintain a constant voltage length product. For example, a longer crystal requires a smaller maximum value of Vo. Control circuitry for controlling the rotatable variable retardance waveplate is well known, for example FIG. 10 is a prior art circuit of Heismann U.S. Pat. No. 5,211,743 which illustrates a control circuit. FIG. 11 shows a control circuit in accordance with this invention wherein a digital signal processor (DSP) 114 provides values to a digital to analog (D/A) converter 112 which provides control voltages to an amplifier 110. Output terminals of the amplifier Vx and Vy are coupled directly to the terminals of the crystal where the voltage is applied. Control is maintained by way of an error feed-back signal which is provided to the DSP 114 by way of an analog-to-digital (A/D) converter 116.

With applied voltage in quadrature the crystal 50 will function as a fully rotatable arbitrary retardance wave plate.

In operation, an in a preferred embodiment, voltage is applied in quadrature to the electrodes 12a, 12b and 14a, such that:

Vx=Vo sin(θ)

Vy=Vo cos(θ)

The voltages Vx and Vy each have a magnitude portion Vo and an angular component θ. The angle θ is variable from 0 to 2π and the voltage Vo is variable and can attain values which yield up to 2π or more retardance. For a crystal having a length of 100 mm and a width of 1 mm the required voltage Vo to achieve 2π retardance voltage is approximatley 260V. Varying θ causes the crystal's fast axis to be effectively rotated by θ/2.

Figure 6:
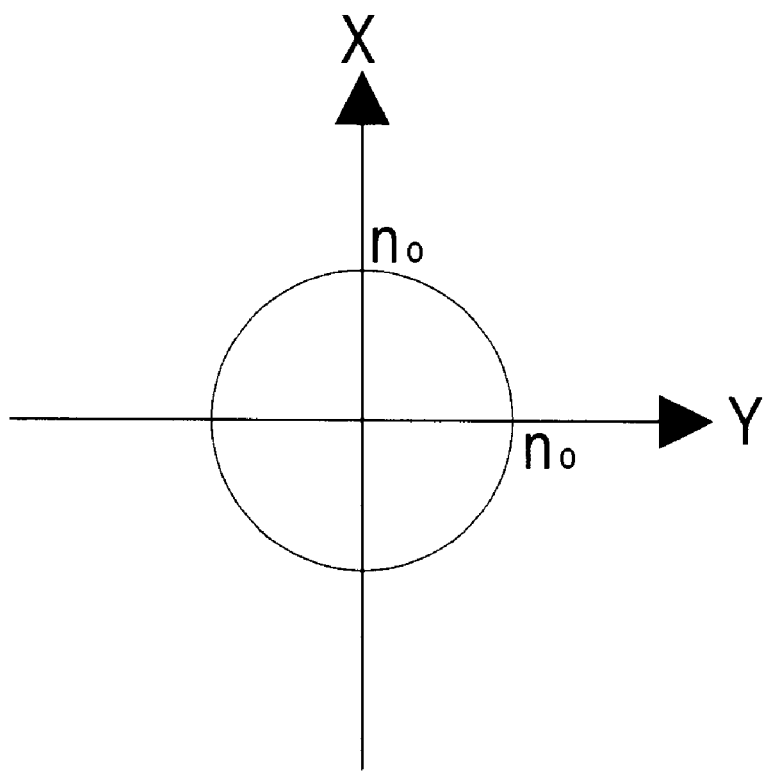
FIG. 6 illustrates the incoming light in accordance with the device of FIG. 5, wherein the radius is equal to the ordinary index and wherein, there is no retardance when no voltage is applied to the crystal unlike the previous transverse device shown in FIG. 4.

With zero volts (i.e. Vo=0V), the birefringence ellipse seen in FIG. 6 by the incoming light is a circle, of radius equaling the ordinary index. Hence, there is no retardance when no voltage is applied to the crystal 50 unlike the previous transverse device shown in FIG. 2.

In accordance with this invention and the embodiment shown in FIG. 5, orientation of the axes of the birefringence ellipse of FIG. 6 is directly related to the choice of θ of the resultant electric field.

In one mode of operation, the DSP 114 is required to maintain a fixed output polarization as the input polarization randomly varies. As the input polarization varies in a continuous but unpredictable manner due to, for example, movements in the input optical fibre, the polarization controller must correspondingly vary $V_0$ and θ in a continuous fashion to convert the input polarization state to the desired output polarization state. In certain applications of the polarization controller in fibre optic transmission systems, if the output state of polarization strays too far from the desired state of polarization, the optical performance of the fibre optic link will be degraded and transmitted data may be lost. A difficulty arises if in response to varying input polarization states the control circuit must increase $V_0$ beyond the level which is physically realizable, to maintain the desired output polarization state. In theory, the controller could in this situation reduce $V_0$ by an amount corresponding to 2π phase retardance, hence performing a reset. This reset would reduce $V_0$ to a level attainable by the control circuit, and would produce the same output polarization state. However, in the process of reducing the phase retardance by 2π, the output state of polarization will traverse a wide variation of polarization states before finally returning to the desired state. During this time interval which is many times longer than the bit rate of the information being transmitted on the fibre, the polarization state will not be at or near the desired state and transmitted information will be lost. The process of reducing $V_0$ by 2π to maintain the desired output state of polarization is an example of an undesired reset operation.

To avoid undesired reset operations, the preferred embodiment maintains the retardance always at or below 2π. The following discussion will describe how this is achieved in an effective reset-free manner.

Figure 12:
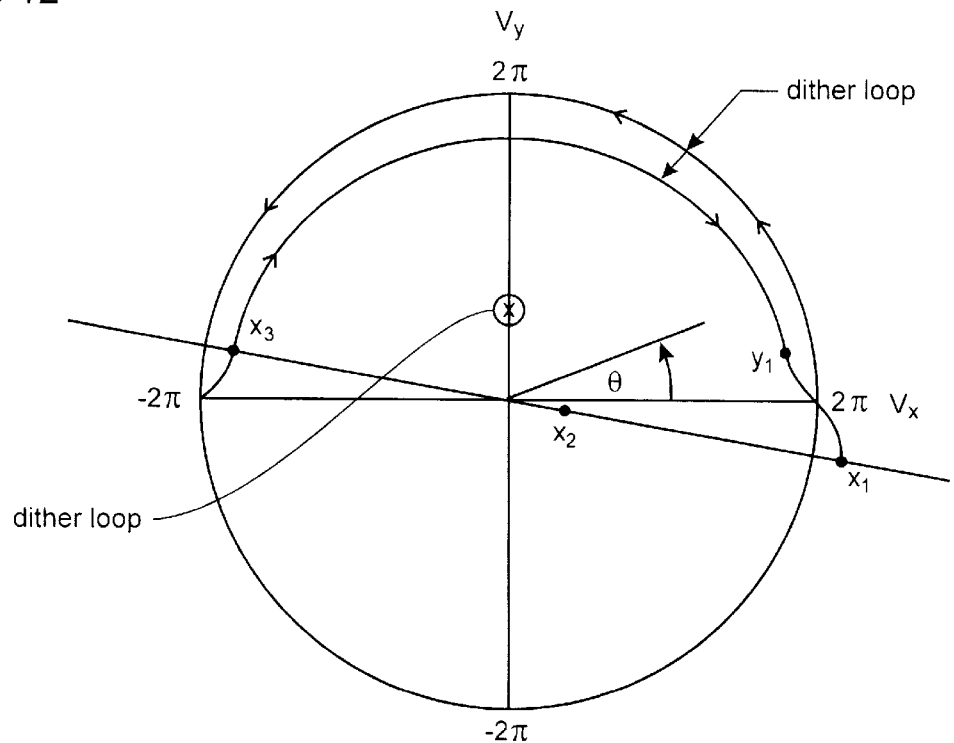

Referring now to FIG. 12, a diagram is having Vx and Vy axes, shows the total allowed control range of Vx and Vy, and the bounding circle which corresponds to 2π retardance for various angles of θ between 0 and 2π. Retardances corresponding to all points outside this allowed control range can be duplicated by points within the allowed control range, by subtracting a multiple of 2π retardance. For example, the point marked 'x1' just outside the circle corresponds to the point 'x2' near the center of the circle (2π retardance subtracted) and also point 'x3' just inside the opposite side of the circle (4π retardance subtracted; negative retardance is equivalent to positive retardance with π added to θ). If it is required to change from a control state 'y1' just inside the allowed control range to control state x1 in order to maintain the desired output polarization state, the control circuit may instead choose state x2 or x3 which will produce the same output polarization state but will have retardance less than 2π. As discussed previously, moving to x2 directly from x1 constitutes an undesired reset operation. However, the control circuitry may change from control state y1 to state x3 without an undesired reset operation. It is to be noted that the entire circle corresponding to 2π retardance will produce the same output polarization state, since 2π retardance is equivalent to zero retardance, which has no effect on the input state of polarization (output SOP=input SOP). Therefore, the control circuit can travel from state y1 to a point on the 2π retardance circle, then traverse the 2π retardance curve by an angle θ=π, then proceed to the state x3. In this process, no large deviations have been made of the output state of polarization from the desired state of polarization, so no transmitted data will be lost. The transition is made in an effectively reset-free manner.

This θ transformation can be performed faster than the changes of the incoming polarization, such that it will be transparent to the incoming and outgoing light. A waveplate of arbitrary optical retardance 0 to 2π will allow for broad wavelength operation. Advantageously, temperature stability is achieved by orienting the crystal 50 such that light propagates along its z-axis.

Figure 7:
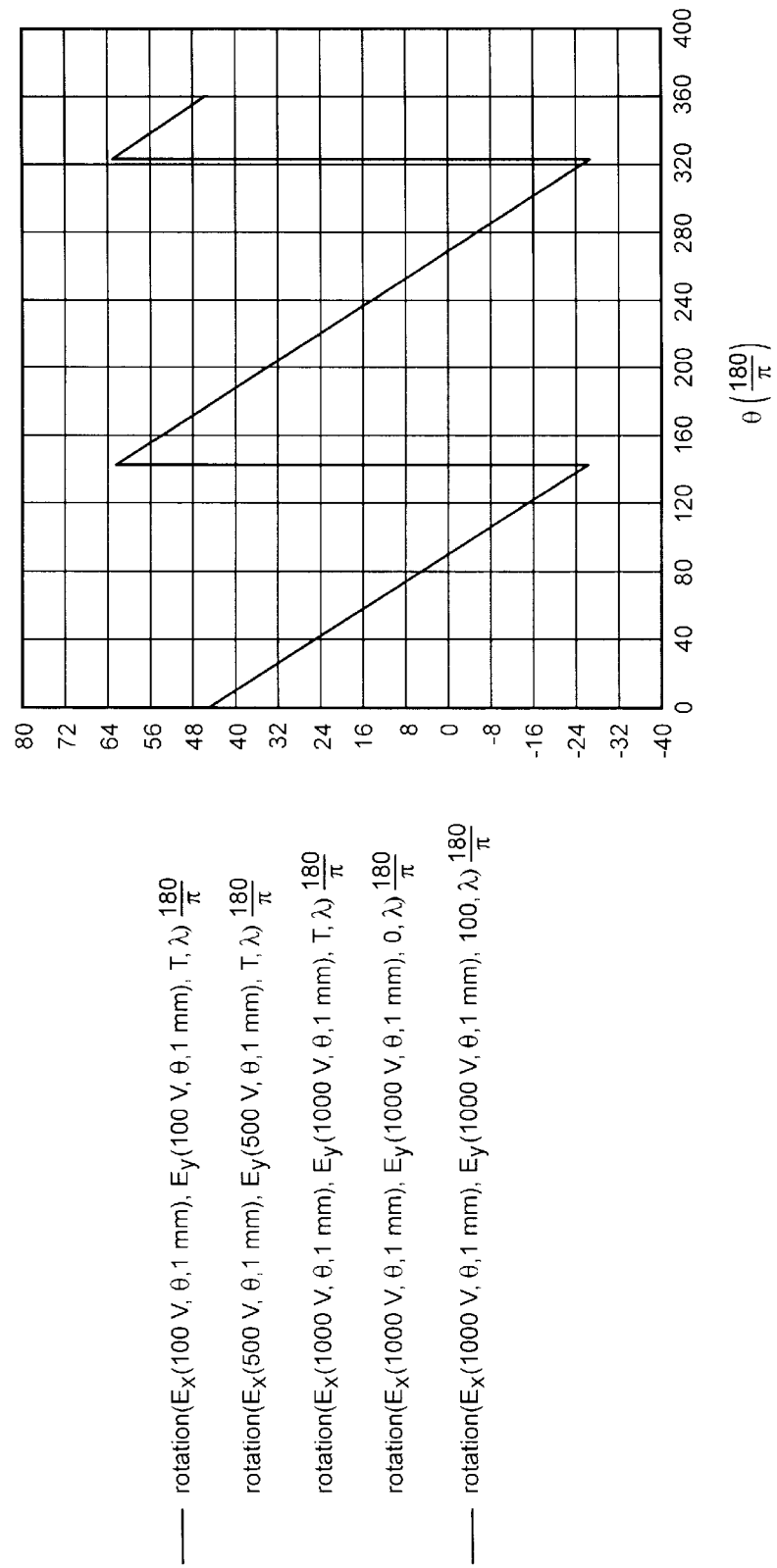
FIG. 7 is a graph which indicates that the orientation of the birefringence ellipse is independent of the applied voltage (Vo), and is independent of the temperature.

The graph of FIG. 7 indicates that the orientation of the birefringence ellipse is independent of the applied voltage (Vo), and is independent of the temperature.

Figure 8:
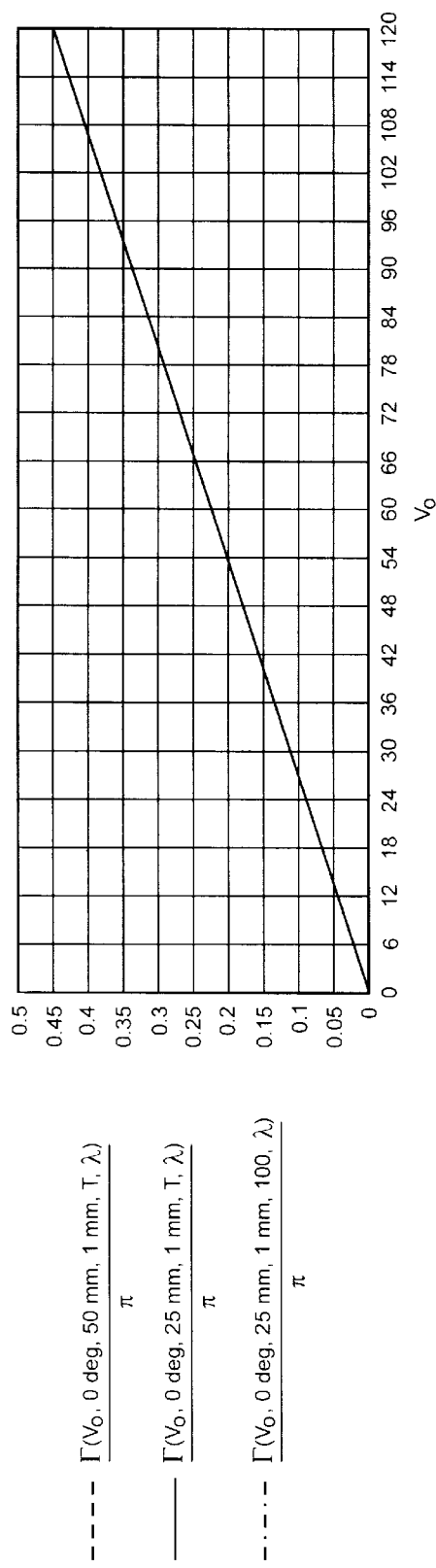
FIG. 8 is a graph which indicates that the retardance is not dependent upon temperature.
Figure 9:
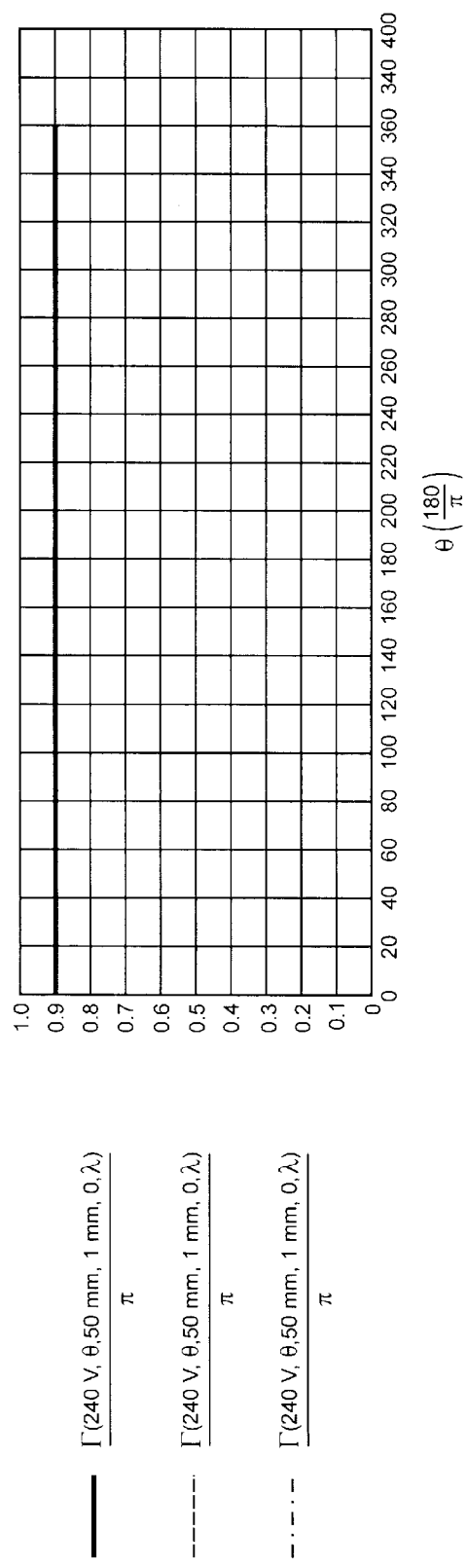
FIG. 9 is a graph which indicates that the retardance is not dependent upon the angle $\theta$.

The retardance is linearly related to the applied voltage Vo. It is evident from the graph of FIG. 8 that the retardance is not dependent upon temperature and from the graph of FIG. 9 that the retardance is not dependent upon the angle θ.

Therefore, in accordance with this invention, the two parameters of the waveplate, retardance and rotation of the birefringence can be controlled by independently controlling two input parameters. The angle θ of the resultant E field can be varied in a controlled manner to control the rotation of birefringence ellipse. Yet still further, the magnitude of the applied voltage Vo can be varied to control the retardance Γ of the waveplate.

Hence this arrangement and control system provides a fast polarization controller, with little or substantially no temperature dependence, where the rotation of the birefringence ellipse and the retardance of the waveplate can independently be controlled by the angle of the applied electric field and the magnitude of the applied voltage Vo. Undesired reset operations can be avoided performing a preferred type of reset, by ensuring that the retardance is maintained at $2\pi$ while the angle is varied to attain a desired reset operation.

What we claim is:

1. A device for varying or maintaining the polarization of an input beam of light comprising:

a block of electro-optic material having a a first pair of opposing terminals at opposing faces of the block for applying a voltage Vx and having a second pair of opposing terminals at other opposing faces of the block for applying a voltage Vy across the block, the block having an input end for receiving the input beam; and, a controller for controlling the voltages Vx and Vy applied ot a firs tand a second pair of electrodes respectively, the votages Vx and Vy having the form of a magnitude component and an angular component such that the angular component of the voltages Vx and Vy is varied in such a manner as to orient an electric filed within the electro-optic material between the pairs of electrodes through a plurality of angles, and such that the magnitude component of the voltages is varied to yield a variable phase retardation.

2. A device as defined in claim 1 wherein the controller is for providing voltages Vx and Vy in quadrature and for controlling the quadrature voltages.

3. A system for varying or maintaining the polarization state of an input beam of light for a given polarization state is provided, comprising:

a block of electro-optic material having pairs of electrodes for applying voltages Vx and Vy in quadrature, a first pair of opposing electrodes disposed on opposing faces of the block for applying the voltage Vx and a second pair of opposing electrodes disposed on other opposing faces of the block for applying the voltage Vy across the block;

the block having an input end for receiving the input beam of light; and, a controller for controlling voltages applied in quadrature to a first and a second pair of electrodes, the quadrature voltages having the form of $V_0\sin\theta$ and $V_0\cos\theta$, the controller for varying the magnitude $V_0$ and an angle $\theta$ such that the applied voltages are varied in such a manner as to orient an electric field within the elctro-optic material between pairs of electrodes through a plurality of angles from 0 to y radians and, the controller for varying the magnitude $V_0$ of the applied voltages to yield a retardation 0 to x radians wherein one of x and y are equal to at least $2\pi$ radians and the other of x and y are equal to at least $\pi$ radians.

4. A system as defined in claim 3 wherein the controller is for varying the magnitude $V_0$ of the applied voltages to yield a retardation 0 to x, wherein one of x and y are equal to at least $2\pi$ radians and the other of x and y are equal to at least mod $2\pi$ radians.

5. A system as defined in claim 2, wherein the controller comprises a suitably programmed digital signal processor coupled with at least a high voltage amplifier.

6. A method of varying the polarization of an input beam of light comprising the steps of:

a) providing two pairs of electrodes disposed about an electro-optic material a first of the two pairs being oriented across orthogonally with respect to a second of the two pairs;

b) passing the input beam of light through the electro-optic material; and, c) providing a plurality of different quadrature voltage values, each voltage value having a magnitude component Vo and an angular component $\theta$ to each of the two pairs of electrodes wherein both the magnitude component Vo and angular component $\theta$ differ between some of the plurality of quadrature voltages provided.

7. A method as defined in claim 6, wherein the angular component $\theta$ is varied between different values to rotate a fast axis of the electro-optic material.

8. A method as defined in claim 6 wherein the magnitude component Vo is varied for varying a phase retardation of the input beam passing through the electro-optic material.

9. A method as defined in claim 8 further comprising the step of decreasing the magnitude component of at least one of the quadrature voltage values after a predetermined maximum magnitude component of the quadrature voltage value is provided.

10. A method as defined in claim 6 further comprising the step of varying the angle $\theta$ after a maximum voltage value is provided while maintaining the voltage Vo at a value corresponding to $2\pi$ radians retardance, to provide an effective reset-free operation.

11. A method as defined in 8 wherein the magnitude component Vo is maintained at a value corresponding to $2\pi$ radians retardance while varying the angle $\theta$ to reach a desired polarization state while avoiding an undesired reset operation.

12. A method of varying or maintaining the polarization of an input beam of light comprising the steps of:

a) providing a first parallel pair of electrodes and a second parallel pair of electrodes, the first pair and the second pair of electrodes lying on substantially orthogonal faces of an electro-optic material b) passing the input beam of light through the electro-optic material; and, c) providing a plurality of different voltage values, each voltage value having a magnitude component and an angular component to each of the two pairs of electrodes wherein both the magnitude component and angular component differ between some of the plurality of quadrature voltages provided.

13. A method as defined in claim 12 further comprising an effective reset-free operation, comprising the step of: maintaining the magnitude component of the voltage at a value corresponding to $2\pi$ radians retardance while varying the angular component to reach a desired polarization state while avoiding a reset operation.

14. A method as defined in claim 12, wherein the magnitude of at least one of the quadrature voltage values is decreased upon the input beam of light being retarded by $2\pi$ radians.

15. A method as defined in claim 12 wherein at least some of the magnitude component values differ by at least $\pi$ radians.

16. A method as defined in claim 12 wherein at least some of the magnitude component values differ by $2\pi$ radians.

* * * * *